March 2, 1971  M. J. GORDON  3,566,411
PANTY HOSE CONSTRUCTION
Filed April 16, 1968  3 Sheets-Sheet 1
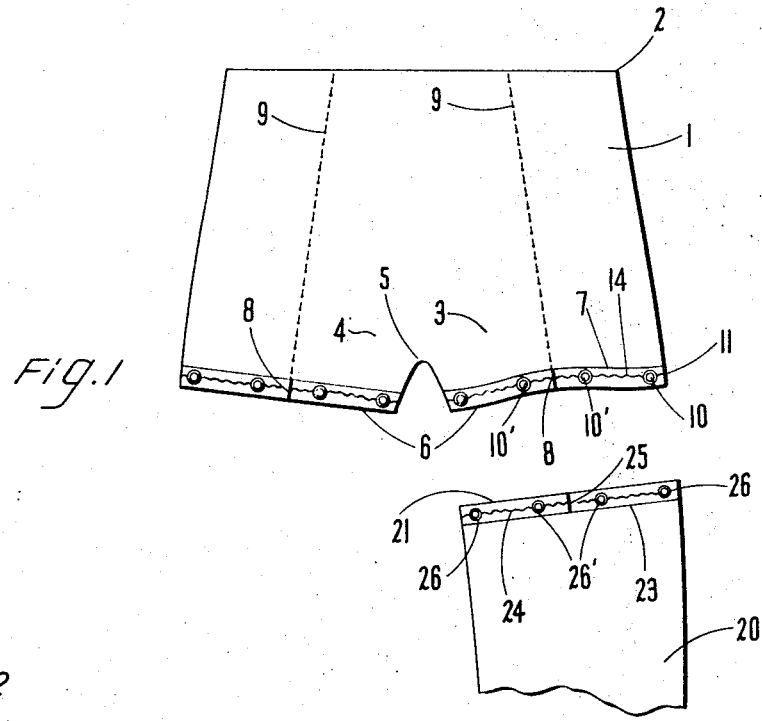
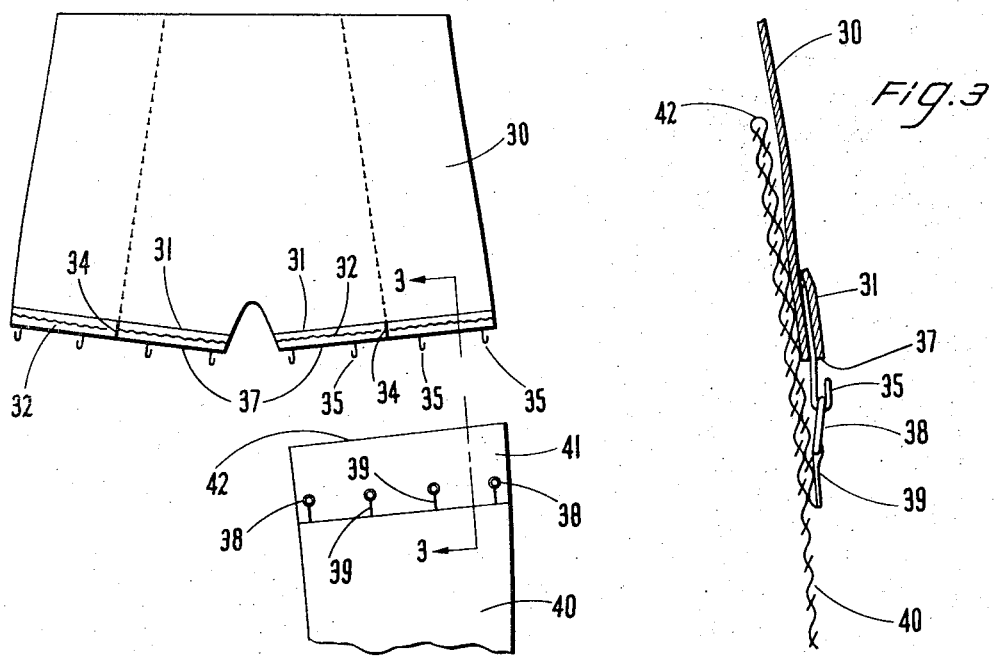
INVENTOR
Melvin J. Gordon
BY
Wolf, Greenfield & Sacks March 2, 1971  M. J. GORDON  3,566,411
PANTY HOSE CONSTRUCTION
Filed April 16, 1968  3 Sheets-Sheet 2

INVENTOR
Melvin J. Gordon
BY
Wolf, Greenfield & Hieken

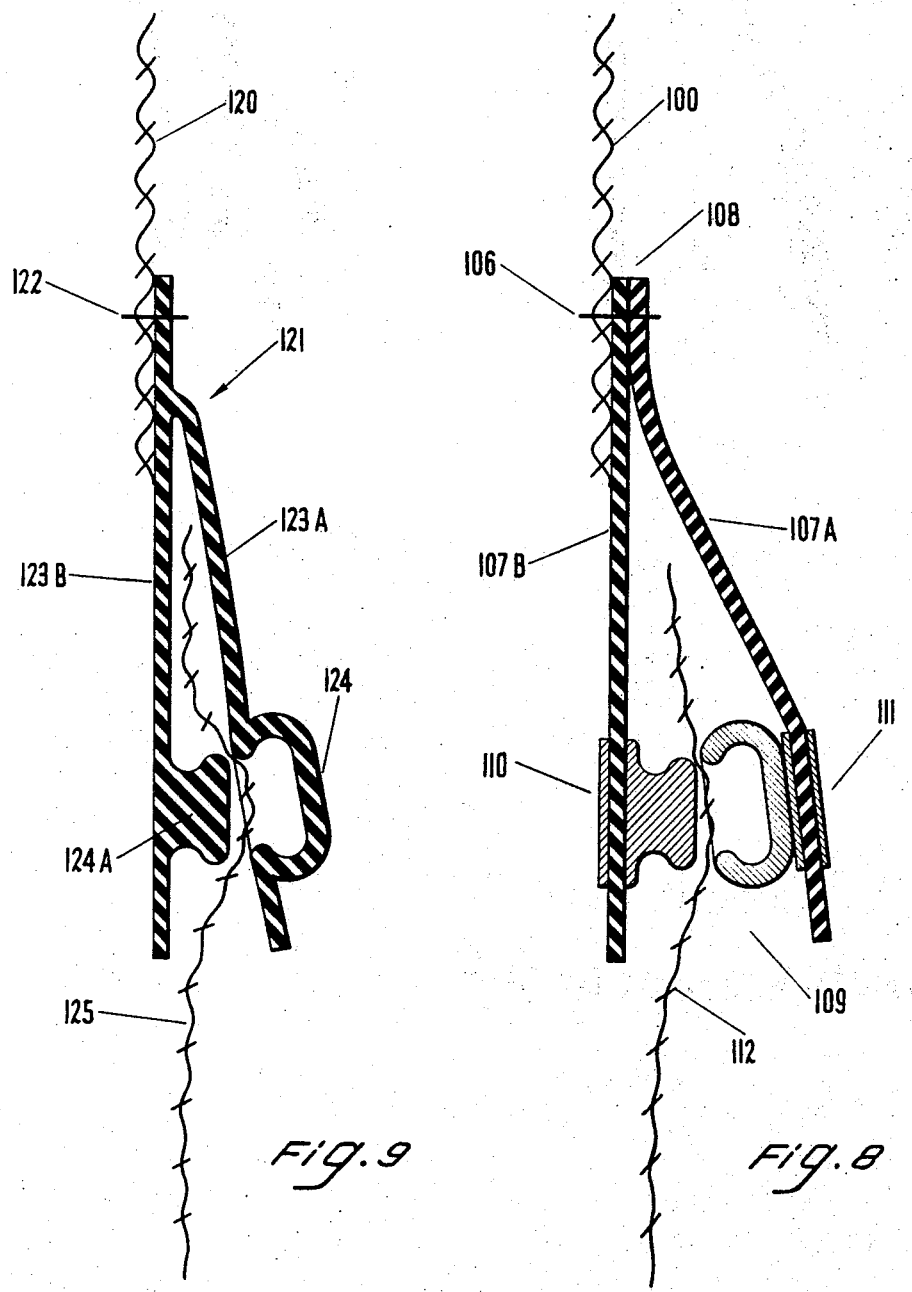

U.S. Patent Office 3,566,411
Patented Mar. 2, 1971

3,566,411
PANTY HOSE CONSTRUCTION
Melvin J. Gordon, Wellesley Hills, Mass., assignor to Manchester Hosiery Mills, Manchester, N.H.
Filed Apr. 16, 1968, Ser. No. 721,804
Int. Cl. A41b *11/00*
U.S. Cl. 2—240
4 Claims

ABSTRACT OF THE DISCLOSURE

A panty hose construction having a separable torso or panty portion and leg portions in which the leg or hose portions are removably secured at the upper periphery to the periphery of the leg openings by fastening means. In one embodiment the fastening means for each hose portion comprises an elastic band that is secured continuously about the leg opening of the panty portion with a series of uniformly spaced fastener halves projecting from the band. Complementary fastener halves are secured to another elastic band at the same uniformly spaced distances with the other elastic band in turn secured to the upper periphery of the hose portion. In another embodiment the fastener consists of a series of rings stitched in spaced relation to the upper periphery of the hose portion at uniform distances with a series of complementary positioned hooks secured to the leg opening of the panty portion. In a third embodiment, an open mesh border extends continuously about and downwardly from the leg openings of the panty portion which mesh is adapted to engage hooks in turn secured to the upper periphery of the hose portions. A fourth fastening means comprises a longitudinally elastic stretchable extruded fastener having complementary extruded female and male portions with the female portion secured to the panty portion about a leg opening and the male portion secured to the inner upper periphery of the hose portion and adapted to be interlocked by pressured inter-engagement with the female portion.

BACKGROUND OF THE INVENTION

A recent fashion trend toward panty hose has resulted in increased demands for improved panty hose constructions. Since the panty portion of a panty hose ordinarily wears better than the hose portion, attempts have been made to provide detachable hose portions for replacement purposes. Those constructions which have been developed to date are inadequate in that the panty portion must be put on the wearer's body separately, thus necessitating reattachment of the hose portions to the body portion each time the panty hose is worn. In addition, the nature of the attachment has not been altogether satisfactory since the attaching mechanisms are widely spaced and do not satisfactorily provide for lateral stretch or flexing, which normally occurs when panty hose is worn. As a result gaping open portions are formed between the attaching means thus resulting in an unsightly and unattractive appearance of the panty hose.

SUMMARY OF THE INVENTION

It is an object of the present invention to provide a panty hose construction in which the hose portions of the panty hose may be removably secured to the panty portion for replacement or cleaning. A further object of the present invention is to provide an improved means and method of attaching separable hose portions and panty portions to form an integral panty hose. A further object of this invention is to provide an improved fastening means for separable hose portions and panty portions in a panty hose combination in which the fastening means may be secured before the panty hose combination is put on in a semipermanent interengagement. A further object of the present invention is to provide a panty hose combination in which the hose portions are uniformly secured along their entire upper periphery to the leg opening of the panty portion without any noticeable openings formed therebetween so as to provide a uniformly continuous appearance to the panty hose construction. A further object of the present invention is to provide a relatively inexpensive means and method of fabricating panty hose constructions in which the hose portions are separable from the panty portions.

In the present invention there is provided in a preferred embodiment a panty hose having separable panty portion and hose portions adapted to be removably interengaged at the upper periphery of the hose portions and the leg openings of the panty portion by continuous fastening means. In one preferred embodiment these continuous fastening means comprise elastic band extending circumferentially about the leg openings and upper periphery of the hose portions with the elastic band having projecting from their surfaces at uniformly spaced distances fastening halves which are complementary in nature so as to permit the fastening halves to be interengaged thereby interengaging the panty portion with the hose portions. In a modification of the invention the continuous fastening means comprises a series of hooks and rings and in a further embodiment, the continuous fastening means comprises continuous extrusions having complementary male and female portions adapted to be interengaged by pressure.

DETAILED DESCRIPTION OF DRAWINGS

These and other objects and advantages of the present invention will be more clearly understood when considered in conjunction with the accompanying drawings, in which:

FIG. 1 is a fragmentary plan elevation of a panty hose construction embodying the present invention;

FIG. 2 is a fragmentary view of a modification of the invention illustrated in FIG. 1 with the hose portions shown separate from the panty portion;

FIG. 3 is a cross sectional view taken substantially along the line 3—3 of FIG. 2 except that the hose and panty portions are shown in interengaged positions;

FIGS. 8 and 9 are schematic illustrations of still further modifications taken in cross sectional details along cross sections similar to that of FIG. 6.

DETAILED DESCRIPTION OF PREFERRED EMBODIMENTS

Figure 4:
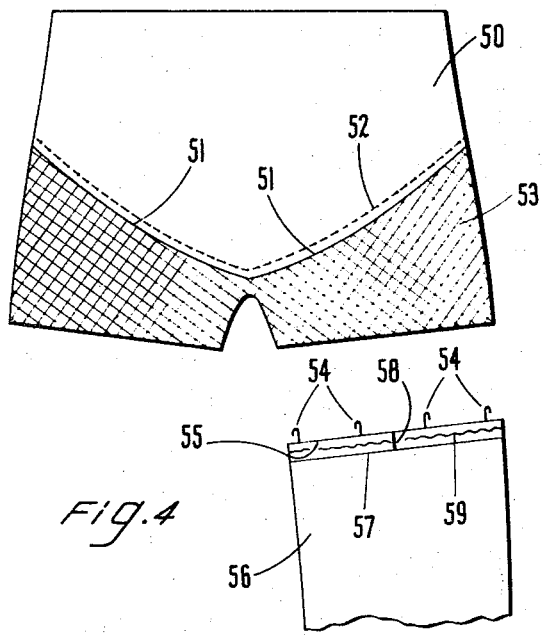
FIG. 4 is a fragmentnary plan view of a further modification of the invention with the hose portion spaced from the panty portion.

Referring first to the embodiment illustrated in FIG. 1 there is shown a conventionally made panty portion or body 1 which may be formed by known techniques on a circular knitting machine with the body having an upper edge 2 which may, if desired, be provided with an elastic band or hem to define the waist of the panty hose. The lower part of this panty portion 1 is divided into two leg portions 3 and 4 separated by a crotch portion 5. The leg portions 3 and 4 each have leg openings which may be seamed or hemmed by conventional techniques at their lower edge or periphery 6. The panty portion may be formed of nylon or other conventional yarn material with a suitable stretch stitching. About the periphery of each of the leg openings there is stitched a band 7 of elastic material with the band formed of finite length and with the free ends commonly stitched by a vertical seam 8 (preferably of a distinctive coloring so as to line up with seam 25 in hose) with the location of the vertical seam 8 coinciding with the fold line 9 of the panty. Secured to the elastic band is a series of fastener halves 10. These fastener halves may comprise conventional male snap fastener halves having a projecting probe or knob which extends outwardly from the surface of the band 7. The base 11 of each of these male halves may be secured directly to the elastic band by stitching or other suitable means prior to the attachment of the band to the panty hose body 1. These male halves 10 are uniformly spaced apart as preferably in the order of 2½" apart on ordinary women's panty hose. It is desirable that they not be positioned any more than 2½" apart in order to avoid unnecessary sagging of the attached hose portions. The male halves 10 one at least one side of the seam 8 should be precisely located from the end of the elastic band 7 as defined by this seam 8. Thus, for example, the male fastener half 10' may be exactly 1¼" from the end of the elastic band and seam 8. The elastic band is conventionally stitched preferably by a zigzag stitch or an elastic yarn 14 to the panty hose continuously about the leg openings 3 and 4.

The hose portions 20 are similar with one being attached to the right and the other to the left leg opening in the panty body 1. These hose portions are preferably knit through their entire length using conventional knitting techniques and may be formed of a stretch yarn or may be knit with a stretch knitting technique. The upper periphery 21 of the hose portion may, if desired, be conventionally finished with a welting or, in the example of FIG. 1, may be left plain. This upper periphery has attached to it an elastic band 23 of finite length which is stitched continuously about the circumference of the periphery 21. A zigzag or stretch stitch 24 may be used. The finite ends of the elastic band 23 are seamed with a distinctive color thread or other suitable means at 25 along the front fold line of the hose portions in exact conformity with the seam 8 on the body 1. The band 23 has secured to it by conventional means, such as stitching, a series of spaced female snap fastener halves 26. These snap fastener halves 26 are spaced apart at distances corresponding to the spacing between the male fasteners 10 with the female snap fastener half 26' closest to the seam 25 spaced the same distance from the seam 25 as is the snap fastener 10' from seam 8.

The wearer of this panty hose may attach the hose portions 20 to the body portions 1 by aligning the colored seams 8 and 25 and securing the corresponding and aligned male and female halves about the periphery and thereafter use the panty portion 1 with its attached hose portions 20 until the hose portions are damaged and require replacement. The snap fasteners illustrated will permit washing of the combination as a unit. The elastic bands 7 and 23 permit minor adjustments of the snap fasteners and also provide sufficient hugging of the panty hose to the wearer to eliminate unsightly openings or sagging.

The embodiment illustrated in FIG. 2 provides a panty portion 30 and leg portions 40 which are substantially similar to those described in connection with FIG. 1. In this arrangement there is also provided an elastic band 31 of finite length which is suitably attached by zigzag stitching or elastic yarn stitching 32 to the leg openings with the end seam 34 of the elastic bands also coinciding with the leg fold lines of the panty body 30. A series of hooks is spaced in a manner similar to the spacing of the male fastener halves 10 of FIG. 1. These hooks may provide a hook portion 35 and an eyelet portion at the end of the shank (not shown), with the eyelet portion being stitched on the inside of the elastic band between the elastic band 31 and the panty portion 30. The hook portion of the hooks 35 extend upwardly preferably to a point just short of or about touching the bottom edge 37 of the elastic band 31. A series of rings 38 are individually stitched by stitching 39 to the welting 41 of the hose portion 40 with the rings 38 being spaced downwardly from the upper edge 42 of the welt a distance preferably of at least 1½". These rings 38 are stitched to the hose portion 40 in alignment with hooks 35.

On attachment and wearing of this combination the welt 41 will underlie the lower portions of the panty body 30 about the leg openings as illustrated in FIG. 3.

In the embodiment illustrated in FIG. 4 there is shown a panty portion 50 having a conventional shape or, if desired, a bikini shape as illustrated and made in a fashion similar to that of the panty portions previously described. The leg openings 51 of this embodiment have secured to them by suitable means such, for example, as stitching 52, annular portions 53 of mesh material which may be formed of any suitable mesh material by any conventional and known technique. The mesh 53 is preferably of the fishnet variety defining a multiplicity of integral interstices arranged in a regular continuous pattern throughout the mesh and is generally highly stretchable in longitudinal and transverse directions. The openings formed by this netting are adapted to receive and engage a series of hooks 54 which in turn are secured about the upper periphery 55 of the leg portions 56 with the hooks 54 preferably secured directly to an elastic band 57 of finite length with the band 57 being stitched about the circumference of the hose portion 56 at its upper end and with the common ends of this band 55 being secured by seaming 58. Suitable zigzag or stretch yarn stitching 59 may be utilized. The hooks 54 are of the type in which eyelets are formed at the shank with the eyelets being stitched to the facing surface of the band 55 which is stitched against the outer surface of the hose portion 56. The hook portions of the hooks 54 are turned downwardly and outwardly and are adapted to be engaged under the mesh portions 53.

Figure 6:
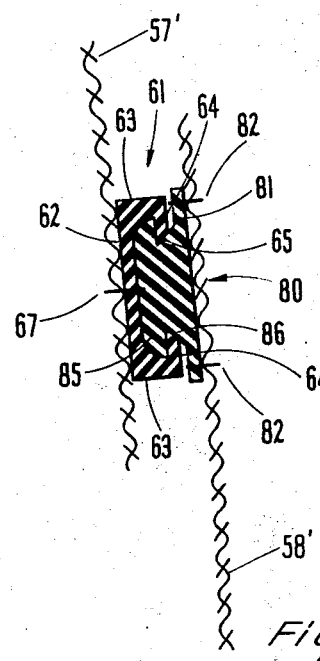
FIG. 6 is a schematically illustrated cross sectional detail taken substantially along the line 6—6 of FIG. 5 but with the hose and body portions shown in interengaged relationship and with the drawing of FIG. 6 on a substantially enlarged scale.
Figure 5:
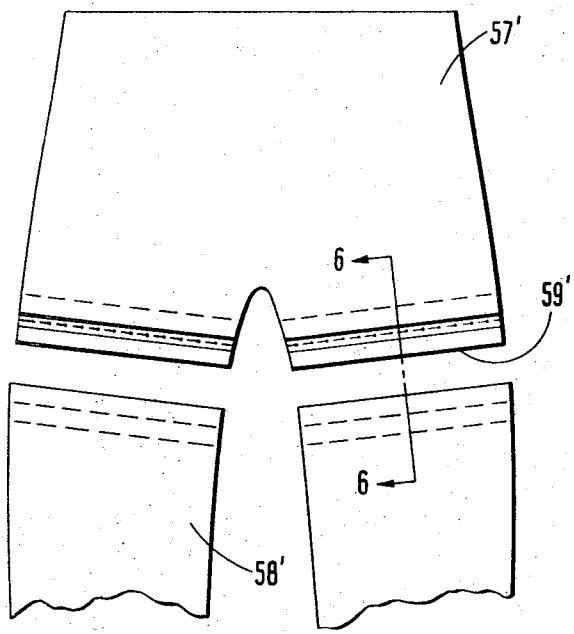
FIG. 5 is a still further modification of the present invention with the hose portion shown spaced from the body portion.

In the embodiment illustrated in FIGS. 5 and 6 there is provided a panty portion 57' and hose portion 58' of similar construction to those previously described. Continuous fastening means are secured in part about the leg openings 59' of the panty portion 57 and at the upper end of the hose portions 58'. These fastening means comprise male and female extruded stretchable members preferably formed of a highly stretchable elastic rubber or plastic material, with the male and female portions adapted to be continuously interlocked. The male portion may be secured to either the leg portions 58' or the body portion 57' with the female portion complementarily secured to the other portion. However in the embodiment specifically illustrated, the male portion is secured to the hose portion 58' and the female portion is secured to the panty portion 57'. The female portion 61 comprises essentially an extruded C-shaped member having a rear wall 62 and end walls 63 with lips 64 extending upwardly from the lower wall 63 and downwarly from the upper wall 63. The lips 64 are beveled along their inner edges 65. The female portion of the continuous fastener is suitably stitched or secured by cement to the body portion 57' by stitching 67 or other suitable means. The securing means should be such as to permit longitudinal extension of the female member when the panty hose is worn and thus an elastic yarn or zigzag stitching should be used if stitching is the desired means for securing the female fastener half 61. The male fastener half 80 comprises essentially an extruded base member 81 which can be cemented or stitched in a fashion similar to the stitching 67 to the inner surface of the leg portions 58′, with the stitching 82 extending preferably continuously along the male portion in the upper and lower projecting segments of the base 81. A head 85 having an undercut 86 is integrally extruded with the base 81. The undercut 86 conforms in shape and size to the shape defined by the lips 64 of the female fastener half and thus provides means for engaging the female portion when the two are pressed together in a direction perpendicular to the major planes of the stocking and hose. This arrangement will normally secure the stocking and hose in a semipermanent attached condition against longitudinal tensions.

Figure 7:
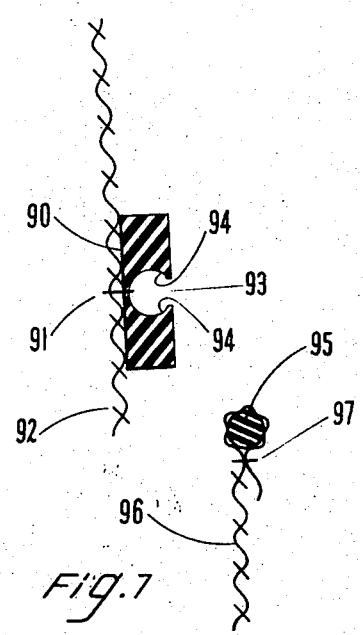
FIG. 7 is a schematically illustrated cross sectional detail taken along a cross section similar to FIG. 6 except that it is open and embodies a further modification.

FIG. 7 illustrates a cross sectional view of a modification of the invention illustrated in FIGS. 5 and 6. In this arrangement there is provided a female continuously extruded half 90 which is secured at its rear wall by elastic stitching or other suitable means 91 to the panty body 92. The female portion provides a recess or continuous channel 93 in part defined by overhanging lips 94. The male half of the fastener comprises a conventional elastic band 95 preferably circular in cross section which is stitched preferably within the extreme upper end of the hose portions 96 about their entire periphery in a hemmed section. The continuous band 95 is secured in the hemmed section by stitching 97 which preferably is an elastic stitching adapted to permit elongation to accommodate flexing and stretching. The band 95 should have a cross sectional dimension greater than the distance between the overhanging lips 94 and sized to be received snugly within the opening formed by the female member upon being pressed into htis opening. The band 95 may also be stitched in spaced relation to the upper end of the hose portion. In such case it is preferable to stitch the band 95 in the welt so that it projects inwardly from the plane of the welt.

Referring to FIG. 8 there is illustrated an embodiment in which the panty hose has a panty portion or body 100 which may be formed by known techniques. Each leg portion of the body 100 has a leg opening which may be seamed or hemmed by conventional techniques. The lower edge or periphery 106 has stitched to it a double band 107a and 107b of elastic material. This double band forms an annular member about the bottom of each leg opening and is stitched at its upper end 108 to the periphery of the leg opening. The lower ends of the double band 107a and 107b are adapted to be spread apart to receive the hose. Intermittently spaced as for example at every two inches is a series of male 110 and female 111 snap fastener halves arranged in pair and adapted to be interengaged. The snap fastener pairs 110 and 111 are designed to receive and interengage between them the upper end 112 of a leg or hose portion of the panty hose. Thus the wearer may spread the halves 107a and 107b apart when the panty hose body 100 is worn. The upper end of the hose 112 is then placed over the inner band 107b and the other half is then rolled over the outside of the hose upper portion 112 and the snap fastener halves are then interengaged with the hose portion sandwiched therebetween.

FIG. 9 illustrates a construction generally similar in arrangement to that of FIG. 8. In this arrangement the panty body 120 has stitched about each of the leg openings a securing member generally illustrated at 121 by continuous stitching 122 to form an annular engaging means about each leg opening of the panty hose body 120. The engaging means 120 consists preferably of an extruded flexible highly stretchable material. This material has two parallel legs including outer leg 123a and inner leg 123b. The leg 123a is preferably formed with an extruded recess 124 which functions as an elongated female member. The leg 123b is provided with a boss or projection 124a which is complementary and adapted to fit into the recess 124 along its entire length to provide an elongated continuous interengagement. The hose portion 125 of the panty hose is adapted to be engaged between the members 124 and 124a along their length to provide a secure interlock which is continuous in nature but which is adapted to be flexed and stretched as the panty hose combination is worn.

What is claimed is:

1. A panty hose construction comprising a separable panty portion and hose portions, said hose portions each having an open upper end, said panty portions comprising a torso with leg openings, a pair of continuous longitudinally extending elastic fasteners comprising male and female fastener portions with at least one formed as a continuous extrusion adapted to receive the other of said fastener portions, means securing said pair of fasteners at least in part to said leg openings with at least one of said portions of each fastener secured each circumferentially about a leg opening, each detachably receiving the other of said fastener portions with an upper part of said hose portion there engaged.

2. A panty hose construction as set forth in claim 1 wherein each of said fasteners comprises complementary male and female extrusions with one secured to said panty portion and the other secured to said hose portions.

3. A panty hose construction as set forth in claim 2 wherein said hose portions each have an upper end with a hem, and said male members each comprise an elongated elastic band secured within a hem of one of said hose portions.

4. A panty hose construction as set forth in claim 1 wherein said male and female fastener portions are connected by an integral web with said fasteners each secured about a leg opening and with the integral web of said fasteners secured above said male and female portions.

References Cited

UNITED STATES PATENTS

| 1,119,884 | 12/1914 | Samuels | 2—240 |
| 3,253,599 | 5/1966 | Bjorn-Larsen | 2—240X |
| 3,325,084 | 6/1967 | Ausnit | 24—204 |

FOREIGN PATENTS

| 1,190,399 | 3/1959 | France | 2—224 |
| 1,197,211 | 6/1959 | France | 2—240 |
| 1,386,250 | 12/1964 | France | 2—224 |

JAMES R. BOLER, Primary Examiner

U.S. Cl. X.R.

128—535